United States Patent
Stender et al.

(10) Patent No.: US 9,067,827 B2
(45) Date of Patent: Jun. 30, 2015

(54) METHOD AND INSTALLATION FOR PRODUCING CEMENT CLINKER

(75) Inventors: Timo Stender, Dortmund (DE); Anna Dinkova, Dortmund (DE)

(73) Assignee: ThyssenKrupp Industrial Solutions AG (DE)

(*) Notice: Subject to any disclaimer, the term of this patent is extended or adjusted under 35 U.S.C. 154(b) by 453 days.

(21) Appl. No.: 13/438,073

(22) Filed: Apr. 3, 2012

(65) Prior Publication Data

US 2012/0247371 A1    Oct. 4, 2012

(30) Foreign Application Priority Data

Apr. 4, 2011    (DE) .................. 10 2011 001 773

(51) Int. Cl.
| | | |
|---|---|---|
| C04B 7/36 | (2006.01) | |
| F27B 7/20 | (2006.01) | |
| F27D 17/00 | (2006.01) | |
| C04B 7/43 | (2006.01) | |
| C04B 7/47 | (2006.01) | |
| C04B 7/44 | (2006.01) | |

(52) U.S. Cl.
CPC ................. *C04B 7/364* (2013.01); *C04B 7/365* (2013.01); *C04B 7/436* (2013.01); *C04B 7/475* (2013.01); *C04B 7/4407* (2013.01); *C04B 7/4423* (2013.01); *C04B 7/4438* (2013.01); *F27B 7/2033* (2013.01); *F27D 17/008* (2013.01); *F27B 7/20* (2013.01)

(58) Field of Classification Search
CPC ...... C04B 7/365; C04B 7/436; C04B 7/4407; C04B 7/475
See application file for complete search history.

(56) References Cited

U.S. PATENT DOCUMENTS

| | | | | |
|---|---|---|---|---|
| 2005/0274066 A1* | 12/2005 | Morton et al. | .................. | 44/606 |
| 2005/0274067 A1 | 12/2005 | Morton et al. | | |
| 2008/0038682 A1* | 2/2008 | Erpelding et al. | .............. | 432/13 |

(Continued)

FOREIGN PATENT DOCUMENTS

| | | |
|---|---|---|
| EP | 1930303 A1 | 11/2008 |
| WO | 03076355 A1 | 9/2003 |

(Continued)

OTHER PUBLICATIONS

Berube, Ron A. "Effective Temperature Control for Cement Kiln Off-Gases". Dec. 28, 2008 [Retrieved May 22, 2014]. Retrieved from http://web.archive.org/web/20081228144940/http://www.cheresources.com/cementkiln.shtml.*

*Primary Examiner* — Kaj K Olsen
*Assistant Examiner* — Karam Hijji
(74) *Attorney, Agent, or Firm* — Renner Kenner Greive Bobak Taylor & Weber

(57) ABSTRACT

During the production of cement clinker by preheating cement raw meal in a preheater and calcining and sintering the preheated cement raw meal, the exhaust gases which are produced during the calcination and the sintering process are used for preheating and are subsequently cleaned in an SCR catalytic convertor. There are used during the clinker production replacement fuels which contain carbon-containing odorous substances and/or ammonia-containing compounds which are previously dried, wherein a drying exhaust gas which is produced during the drying operation and/or exhaust vapor condensate being used at least partially for exhaust gas quenching upstream of the SCR catalytic convertor, and the carbon-containing odorous substances and/or ammonia-containing compounds in the drying exhaust gas and/or exhaust vapor condensate being converted on the SCR catalytic convertor.

10 Claims, 1 Drawing Sheet

(56) References Cited

U.S. PATENT DOCUMENTS

2010/0000119 A1* 1/2010 Ueno et al. ............... 34/493
2010/0307388 A1* 12/2010 Secklehner ............... 110/217

FOREIGN PATENT DOCUMENTS

WO    WO 2009089559 A1 *   7/2009
WO    2010124702 A1   11/2010

* cited by examiner

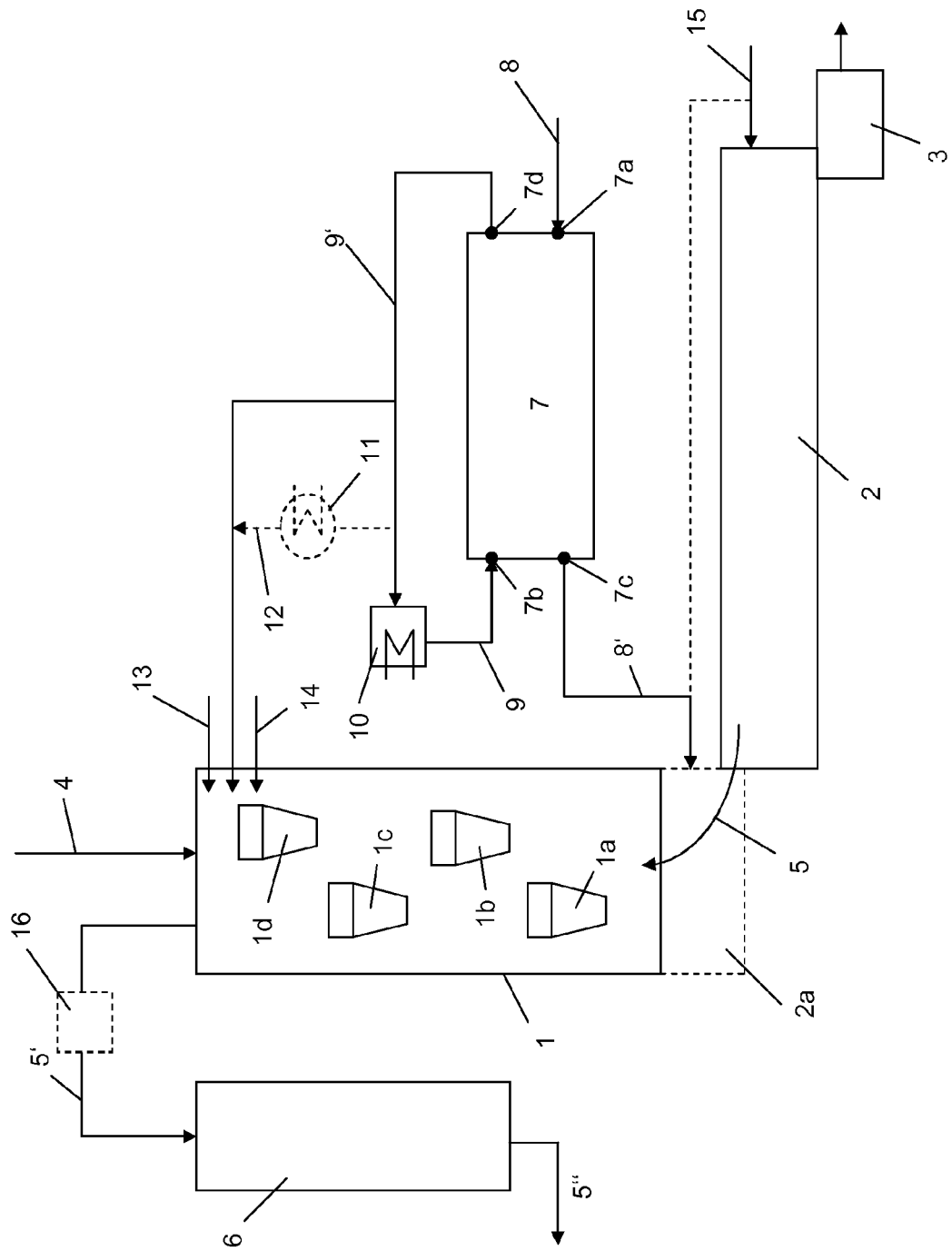

METHOD AND INSTALLATION FOR PRODUCING CEMENT CLINKER

TECHNICAL FIELD

The invention relates to a method and an installation for producing cement clinker by preheating and calcining cement raw meal in a thermal processing device, the exhaust gases which are produced during the clinker production being used for preheating.

BACKGROUND OF THE INVENTION

The burning of cement clinker is currently carried out almost exclusively in cylindrical rotary kiln installations at temperatures of around 1,450° C. The energy required for burning is generally provided by burning conventional fuels, such as coal, in the main burner. For cost reasons, the conventional fuels are being increasingly replaced in practice by replacement fuels. However, the use of replacement fuels leads to a change in the flame shape and the temperature distribution in the kiln and thereby to an increased energy requirement, which results in correspondingly higher exhaust gas temperatures.

The cement raw meal is heated and calcined in a heat exchanger which is usually constructed as a counter-current cyclone heat exchanger with the kiln exhaust gas before being introduced into the kiln. In the heat exchanger tower, there is generally a calcinator upstream of the kiln inlet. In addition to the main burner, fuel is fed in the calcinator or at the kiln inlet, whereby a high calcination rate is achieved, the volume flow in the kiln is reduced and the clinker production is increased. It is also possible to use as a fuel in the calcinator inter alia biological waste, such as sewage sludge.

The sewage sludge of the communal waste water purification operation typically has, after mechanical dehydration, water contents of approximately 70% by weight. However, the introduction of sludge with high levels of moisture and correspondingly low thermal values would make no significant contribution to the calcination. Instead, the introduction of sewage sludge with high levels of moisture can be considered as disposal of the sewage sludge. At the high temperatures in the calcinator, odorous substances, such as carbon and ammonia compounds, become decomposed. However, the introduction leads to an increasing volume flow of exhaust gas, which requires greater sizing of the preheater or limits the production in existing installations.

It is therefore advantageous to dry the sewage sludge before it is added. The exhaust gases which are produced during drying (vapour or air) are loaded with carbon- and ammonia-containing odorous substances, the preparation of the loaded exhaust gases or the exhaust vapour condensate (after condensation of the exhaust vapour) being able to be carried out by means of washers and/or biofilters. However, the complexity of the installation increases significantly as a result. It is therefore proposed in WO-2010-124702 to guide the exhaust gas which is produced into the clinker cooler whereby, however, a reduction of the cooler output must be taken into account. US-2005-0274067 describes the supply to the cement production process, but with the supply to the calcinator or the kiln leading to lower clinker production.

In EP1930303A1, raw biogas is used as a fuel in cement production, the raw biogas containing significant amounts of ammonia, which act as a reduction agent with respect to nitrogen oxides.

SUMMARY OF THE INVENTION

An object of the invention is therefore to improve the method and the installation for producing cement clinker using secondary fuels with high levels of moisture, without complex cleaning of the excess exhaust gas from the dryer being required and without the clinker production being limited.

This object is achieved by the features of claims 1 and 8.

In the method according to the invention for producing cement clinker by preheating cement raw meal in a preheater and calcining and sintering the preheated cement raw meal, the exhaust gases which are produced during the calcination and the sintering process are used for preheating and subsequently cleaned in an SCR catalytic convertor. During the calcination, replacement fuels containing carbon-containing odorous substances and/or ammonia-containing compounds are used which are previously dried, wherein a drying exhaust gas which is produced during the drying operation and/or exhaust vapour condensate being at least partially used for exhaust gas quenching upstream of the SCR catalytic convertor and the carbon-containing odorous substances and/or ammonia-containing compounds being converted in the drying exhaust gas and/or exhaust vapour condensate on the SCR catalytic convertor.

The installation according to the invention for producing cement clinker in accordance with the above method substantially comprises a replacement fuel dryer for drying replacement fuels which contain carbon-containing odorous substances and/or ammonia-containing compounds having a first output for the dried replacement fuel and a second output for a drying exhaust gas which is produced during the drying operation and/or an exhaust vapour condensate, a thermal processing device for preheating and calcining the cement raw meal, which is connected to the first output of the replacement fuel dryer in order to supply the dried replacement fuel and the exhaust gases which are produced during the clinker production being used for preheating, and an SCR catalytic convertor for cleaning the exhaust gases used in the preheater, the second output of the replacement fuel dryer being connected for the purposes of exhaust gas quenching to a connection region which directs the exhaust gas to the SCR catalytic convertor.

The high temperatures when burning cement clinker produce high concentrations of nitrogen oxides in the order of magnitude of from 1,200 mg/Nm$^3$ at 10% O$^2$. The NO$_x$ reduction is carried out by means of the addition of NH$_3$-containing reduction agents. The 17. BImSchV (Federal Emission Protection Law) controls the NO$_x$ emissions when burning waste for installations for the production of cement clinker, an NO$_x$ threshold value of between 500 and 200 mg/Nm$^3$ at 10% O$_2$ being applicable depending on the proportion of replacement fuel in the combustion heat output. Threshold values in the lower region of this range can generally not be achieved by means of the conventional denitrification using SNCR.

The use of SCR, catalytic denitrification, is therefore necessary. In this instance, the SCR catalytic convertor is preferably integrated directly downstream of the preheater in the exhaust gas line, since an advantageous temperature range for the catalytic denitrification is provided at that location for reasons relating to production.

The exhaust gas is still used for drying raw materials downstream of the preheater. Afterwards, however, the temperature range is too low for the catalytic denitrification. Owing to the SO$_2$ load in the exhaust gas, however, ammonium sulphates would further be deposited in the SCR catalytic convertor, which would lead to the deactivation of the active catalytic convertor centres. A complex heat displacement system and an additional energy supply would therefore be required.

The SCR catalytic convertor is generally constructed as a honeycomb type or plate type catalytic convertor with very small openings of approximately 10 mm. The very high dust loads of approximately 70 g/Nm$^3$ which are present downstream of the preheater can therefore lead to clogging of the channels. At relatively high exhaust gas temperatures, in particular greater than 400° C., as often found as a result of the combustion of high secondary fuel rates downstream of the preheater, there is produced a higher durability of the dusts compared with the dust properties at lower temperatures of, for example, 350° C., which are produced when conventional fuels are used. The ability to flow is reduced accordingly and the danger of clogging increases.

Owing to the use of the drying exhaust gas produced during the drying operation and/or exhaust vapour condensate for exhaust gas quenching upstream of the SCR catalytic convertor, the danger of clogging in the SCR catalytic convertor can be reduced. Furthermore, the supply of the drying exhaust gas and/or the exhaust vapour condensate has the advantage that carbon-containing odorous substances contained are oxidised with oxygen in the SCR catalytic convertor and the ammonia contained reduces the nitrogen oxides so that the quantity of ammonia water supplied to the NO$_x$ reduction can be reduced accordingly.

The dependent claims relate to other configurations of the invention.

Replacement fuels which it is possible to use include mechanically or thermally treated sludge which is produced during communal or industrial waste water treatment, other industrial sludge or biological waste products. The secondary fuel is reduced to a moisture content of preferably less than 15% in a replacement fuel dryer which is constructed, for example, as a convection and/or contact dryer, before it is supplied as fuel to the thermal processing device, in particular to a calcinator or the kiln.

The exhaust gas or exhaust vapour condensate from the replacement fuel dryer is supplied upstream of the SCR catalytic convertor in order to reduce the preheater exhaust gases upstream of the SCR catalytic convertor to temperatures of between 280 and 400° C. and preferably to temperatures of between 330 and 370° C. and thereby to reduce the risk of the SCR catalytic convertor becoming clogged. The quenching is preferably carried out in the uppermost cyclone stage of a preheater which has a plurality of cyclone stages which are arranged one above the other with exhaust vapour condensate from the replacement fuel dryer since the highest cooling output is thereby achieved.

On the SCR catalytic convertor, in addition to a conversion of NO$_x$ with NH$_3$ which is supplied as a reduction solution to N$_2$, there is also carried out a simultaneous conversion (oxidation) of hydrocarbons. Owing to the combination of the exhaust gas or exhaust vapour removal with the exhaust gas quenching, no additional complex cleaning of the exhaust gas flows of the dryer occurring is consequently necessary and the requirement for fresh water and/or cooling gas for exhaust gas quenching can be reduced.

The energy required for the sewage sludge drying is preferably produced indirectly by means of heat transfer. To this end, the energy required for drying the replacement fuels could be decoupled from the cement process. The decoupled portion is preferably returned to the respective exhaust gas line again after use. The necessary heat for drying can be taken in this instance, for example, completely or partially downstream of the SCR catalytic convertor, the preheater, the kiln inlet region or the cooling process. A mixture of various energy sources for drying is also conceivable.

BRIEF DESCRIPTION OF THE DRAWINGS

Other advantages and embodiments of the invention will be explained below in greater detail with reference to the description and the drawing.

The drawing is a schematic illustration of an installation according to the invention for producing cement clinker.

DESCRIPTION OF ILLUSTRATIVE EMBODIMENTS

The installation has a thermal processing device which comprises in the illustrated embodiment a preheater 1, a kiln and a cooler 3. The preheater 1 is constructed as a suspension type heat exchanger with a plurality of cyclone stages 1a to 1d which are arranged one above the other, cement raw meal 4 being preheated in counter-current to exhaust gases 5 which are produced during the clinker production and the calcination. An optional calcinator 2a for calcination of the preheated cement raw meal is further arranged between the preheater 1 and kiln 2.

The cement raw meal which is burnt to form cement clinker in the kiln 2 is subsequently cooled in the cooler 3.

The exhaust gas 5' which leaves the preheater 1 is subsequently cleaned in an SCR catalytic convertor 6, the cleaned exhaust gas 5" being used in a drying milling installation (not illustrated) or being supplied directly to a process filter. Between the preheater 1 and the SCR catalytic convertor 6 it is optionally possible to use an electric filter 16 for preliminary dust removal.

In order to provide at least a portion of the fuel required for calcination, there is further provided a replacement fuel dryer 7 by means of which replacement fuels 8, the mechanically or thermally treated sludges which occur, for example, in communal or industrial waste water treatment, other industrial sludges or biological waste products, can be dried. The replacement fuels are preferably dried to a moisture content of <15%. The replacement fuel dryer 7 has a first input 7a for replacement fuel 8 to be dried, a second input 7b for supplying a drying gas 9, a first output 7c for the dried fuel 8' and a second output 7d for drying exhaust gases 9' which are produced during the drying operation. The replacement fuel dryer 7 is formed, for example, by a contact dryer, in which the heat is supplied by means of the contact between the wet product and a heated wall or a convection dryer, in which the required thermal energy is supplied by means of a gas flow.

In the embodiment illustrated, a portion of the drying exhaust gas 9 is recirculated and indirectly heated in a heat exchanger 10 before being repeatedly returned to the replacement fuel dryer 7. The energy required for this is preferably decoupled from the cement process, it being possible in particular to use the cleaned exhaust gas 5", the exhaust gas 5' from the preheater 1, the exhaust gas 5 from the kiln inlet region or the exhaust gas of the cooler 3. A mixture of various energy sources for drying is also conceivable. Advantageously, the decoupled portion is returned to the respective exhaust gas line again after use in the heat exchanger 10.

The other portion of the drying exhaust gas 9' is introduced for the purposes of exhaust gas quenching into a connection region which leads to the SCR catalytic convertor. In this instance, the uppermost cyclone stage 1d of the preheater 1 is particularly suitable. If the dryer exhaust gas 9' is present as exhaust vapour, this is first supplied to a condenser 11, the exhaust vapour condensate 12 which is produced in this instance being introduced for the purposes of exhaust gas quenching into the connection region which leads to the SCR catalytic convertor. However, it would also be conceivable for the drying exhaust gas or the exhaust vapour condensate 12 to be introduced into an exhaust gas line which connects the preheater 1 to the SCR catalytic convertor 6. Depending on requirements, it may be necessary, in addition to the drawn-off dryer exhaust gas 9' or the exhaust vapour condensate 12, to additionally supply fresh water or cooling gas 13 upstream of the SCR catalytic convertor 6 for exhaust gas quenching.

There may further be supplied in this region an ammonia-containing reduction agent 14 for the reduction of nitrogen oxides. The ammonia-containing reduction agent may be partially reduced by means of the ammonia-containing compounds in the dryer gas 9' or in the exhaust vapour condensate 12.

The kiln is operated with fuel 15, which can be replaced completely or partially by the dried fuel 8'. The fuel 8' dried in the replacement fuel dryer 7 may further be supplied to the preheater 1, the inlet region of the kiln 2 and/or the calcinator 2a.

The invention claimed is:

1. A method for producing cement clinker comprising the steps of:
   preheating cement raw meal in a preheater and producing preheated cement raw meal and preheater exhaust gas;
   calcining and sintering the preheated cement raw meal, thus producing exhaust gases which are used in said step of preheating;
   drying replacement fuel to produce dried replacement fuel and drying exhaust gas, wherein the dried replacement fuel is used in said calcining and sintering step;
   quenching the preheater exhaust gases upstream of an SCR catalytic convertor using said drying exhaust gas and/or exhaust vapour condensate thereof, wherein said drying exhaust gas and/or exhaust vapour condensate contain carbon-containing odorous substances and/or ammonia-containing compounds from said replacement fuel; and
   cleaning the preheater exhaust gas and the drying exhaust gas and/or exhaust vapor condensate in the SCR catalytic converter, the carbon-containing odorous substances and/or ammonia-containing compounds in the drying exhaust gas and/or exhaust vapour condensate being converted in the SCR catalytic converter.

2. The method according to claim 1, the replacement fuels being dried to a moisture level of less than 15%.

3. The method according to claim 1, the SCR catalytic convertor reducing nitrogen oxides and oxidising hydrocarbons.

4. The method according to claim 1, the exhaust gas temperature upstream of the SCR catalytic convertor being reduced by the exhaust gas quenching to a temperature of between 330 and 370° C.

5. The method according to claim 1, fresh water or cooling gas additionally being supplied for exhaust gas quenching in addition to the drawn-off dryer exhaust gas.

6. The method according to claim 1, the energy required for said step of drying is provided from the cement process.

7. The method according to claim 1, the energy required for drying the replacement fuels being indirectly transferred.

8. The method according to claim 1, wherein said step of cleaning produces cleaned exhaust gases, and the energy required for said step of drying is provided by one or more of the exhaust gases, the preheater exhaust gases and the cleaned exhaust gases.

9. The method according to claim 1, wherein the replacement fuel is selected from the group consisting of industrial sludges, sludges from communal or industrial waste water treatment, and biological waste products.

10. The method according to claim 1, wherein the replacement fuel is sewage sludge.

* * * * *